United States Patent [19]
Schiessl et al.

[11] 3,835,134
[45] Sept. 10, 1974

[54] POLYCHLOROISOCYANURIC ACIDS PREPARED FROM A MONOALKALI METAL CYANURATE

[75] Inventors: Henry W. Schiessl, Northford; Duane L. Sawhill, Orange; Sudhir K. Bhutani, West Haven, all of Conn.

[73] Assignee: Olin Corporation, New Haven, Conn.

[22] Filed: Apr. 20, 1973

[21] Appl. No.: 353,097

[52] U.S. Cl. ............................................ 260/248 C
[51] Int. Cl. ............................................ C07d 55/42
[58] Field of Search ................................. 260/248 C

[56] References Cited
UNITED STATES PATENTS
3,397,206  8/1968  Nicolaisen ........................ 260/248

*Primary Examiner*—John M. Ford
*Attorney, Agent, or Firm*—Donald F. Clements; Thomas P. O'Day

[57] ABSTRACT

Polychloroisocyanuric acids are produced by the reaction of monoalkali metal cyanurate with hypochlorous acid and a chlorine-containing compound selected from the group consisting of chlorine and chlorine octahydrate where the molar ratio of chlorine-containing compound to monoalkali metal cyanurate is at least 1:1. Where an excess of chlorine-containing compound is used, this excess is employed to remove any gaseous by-products such as nitrogen trichloride, which may be formed during the reaction. This excess containing gaseous by-products is reacted with an alkali metal compound to convert the chlorine present to an alkali metal hypochlorite, which is further reaction to form hypochlorous acid. The hypochlorous acid can be used in the chlorination reaction. Reaction conditions include a temperature range of from $-5°$ to $45°C$. and a pH of 3 to 4.5.

19 Claims, No Drawings

POLYCHLOROISOCYANURIC ACIDS PREPARED FROM A MONOALKALI METAL CYANURATE

This invention relates to a process for the production of polychloroisocyanuric acids by the chlorination of monoalkali metal cyanurates. Polychloroisocyanurates are well known products used in washing, bleaching and sanitizing applications.

It is known to react di- or trisodium cyanurate with a chlorinating agent such as chlorine to produce di- or trichloroisocyanuric acid. See, for example, U.S. Pat. Nos. 2,956,056 issued to Christian and 2,964,525 issued to Robinson.

Di- or trisodium cyanurate are prepared by the reaction of at least two or three moles of caustic soda respectively with one mole of cyanuric acid. During the chlorination of the cyanurate, at least two or three moles of sodium chloride are produced which must be disposed of. In addition, the reactions are highly exothermic and operational difficulties result through the plugging of heat exchangers required for heat removal.

Also known is the use of hypochlorous acid to chlorinate cyanuric acid to produce di- or trichloroisocyanuric as disclosed in Sconce, J.S., Chlorine, Reinhold, 1962, p. 532 and U.S. Pat. No. 3,712,891 issued to Berkowits and Mesiah.

Such a process, as well as the first-mentioned process, produces di- and trichloroisocyanuric acids which are relatively soluble in the reacting medium. Incomplete precipitation of the product results in an economic loss of product or the increased expense of the recirculation of liquors containing relatively large amounts of product or requires a costly waste treatment process to avoid polluting natural resources.

An object of the present invention is a process for preparing polychloroisocyanuric acids having a high degree of product recovery from the reaction mixture.

Another object of the process of the present invention is the removal of the explosively dangerous gaseous by-product nitrogen trichloride formed and its decomposition to recover valuable raw materials.

These and other objects of the invention will be apparent from the following detailed description of the invention.

Briefly, the process of the present invention for producing a polychloroisocyanuric acid comprises reacting an aqueous slurry of a monoalkali metal cyanurate with hypochlorous acid and a chlorine-containing compound selected from the group consisting of chlorine and chlorine octahydrate to form a reaction slurry containing polychloroisocyanuric acid, wherein the molar ratio of the chlorine-containing compound to the monoalkali metal cyanurate is at least 1:1, and separating the polychloroisocyanuric acid from the reaction slurry.

More in detail, an aqueous slurry of any monoalkali metal cyanurate, for example, sodium, potassium, or lithium can be reacted in accordance with the process of this invention. A preferred embodiment is the use of monosodium alkali metal cyanurate. For example, the slurry should be at such a concentration that it can be pumped or conveyed under the reaction conditions employed and yet not be so dilute that an excessive amount of water must be handled. An aqueous slurry of monoalkali metal cyanurate containing from about 10 to about 35 percent, preferably from about 12 to about 30 percent of solids is suitable.

The amount of chlorine-containing compound fed to the reaction slurry is at least the stoichiometric amount required to react with the monoalkali metal cyanurate, that is a molar ratio of chlorine-containing compound to monoalkali metal cyanurate of at least 1:1. Preferably, the proportion employed is in excess of the stoichiometric amount required to react with monoalkali metal cyanurate as in Equations (1) and (2) below, for example, a molar ratio of chlorine-containing coupound to the monoalkali metal cyanurate in the range from about 1.01:1 to about 5:1, and preferably from about 1.1:1 to about 4:1. Excess chlorine-containing compound above the proportion necessary to react with the monoalkali metal cyanurate may be used to sweep nitrogen trichloride and other reaction gases from the reaction slurry as described more fully below.

Hypochlorous acid of any convenient strength can be employed, for example, an aqueous solution containing from about 2 to about 20 percent by weight of HOCl. Preferably, a solution containing from about 5 to about 10 percent, and more preferably from about 6 to about 8 percent by weight of HOCl is used.

When a chlorine-containing compound is fed to the reaction slurry in the proportions described above, sufficient hypochlorous acid is fed to the reaction slurry to provide at least a stoichiometric proportion of hypochlorous acid to form dichloroisocyanuric acid and trichloroisocyanuric acid in accordance with Equations (1) and (2) below. For example, when the desired product is dichloroisocyanuric acid and the chlorine-containing compound is fed to the reaction slurry in the proportion described above, the molar ratio of hypochlorous acid to monoalkali metal cyanurate fed to the reaction slurry ranges from about 1:1 to about 1.1:1. Similarly, when desired product is trichloroisocyanuric acid the molar ratio of hypochlorous acid to monoalkali metal cyanurate fed to the reaction slurry ranges from about 2:1 to about 2.2:1. Thus, it can be seen that when these specific polychloroisocyanuric acids or mixtures thereof are desired as products, the molar ratio of hypochlorous acid to monoalkali metal cyanurate ranges from about 1:1 to about 2.2:1 when the chlorine-containing compound is fed to the reaction slurry in the proportions described above. Greater proportions of hypochlorous acid may be used if desired, but these excess proportions are generally uneconomical. The term "polychloroisocyanuric acid" as used throughout the description and claims includes dichloroisocyanuric acid, trichloroisocyanuric acid and mixtures thereof.

The molar ratio of chlorine-containing compound to hypochlorous acid is from about 1:2 to about 7:2 , and preferably from about 1.1:2 to about 6:2 for the preparation of trichloroisocyanuric acid. In preparing dichloroisocyanuric acid, a molar ratio of chlorine-containing compound to hypochlorous acid of from about 1:1 to about 7:1 and preferably from about 1.1:1 to about 6:1 is used.

The molar ratio of alkali metal cyanurate to that of the combined moles of hypochlorous acid and the chlorine-containing compound fed to the reactor determines the degree of chlorination and thus the polychloroisocyanuric acid product obtained. As indicated below in Equation (1), a molar ratio of alkali metal cyanurate to that of hypochlorous acid plus chlorine-containing compound of about 1:2 gives dichloroisocyanuric acid. As indicated below in Equation (2), molar ratio of 1:3 gives trichloroisocyanuric acid.

The feed rates of monoalkali metal cyanurate, hypochlorous acid and chlorine-containing compounds are adjusted to give the desired pH and reactor retention time in the reaction slurry. The pH of the reaction is maintained in the range from about 3 to about 4.5, and preferably from about 3 to about 4. The reactor retention time can vary, for example, from about 3 to about 45 minutes and preferably from about 5 to about 30 minutes.

The reaction temperature is maintained at from about $-5°$ to about $45°C.$, preferably from about $10°$ to about $25°C.$ A slurry of polychloroisocyanuric acid is produced containing from about 10 to about 20 percent by weight of solids. The polychloroisocyanuric acid product may be recovered from the resulting mother liquor containing any alkali metal chloride in solution by an suitable method of separation such as filtering or centrifuging.

The reactions of the present invention are illustrated by the following equations, in which monosodium cyanurate is used as the monoalkali metal cyanurate and chlorine is used as the chlorine-containing compound:

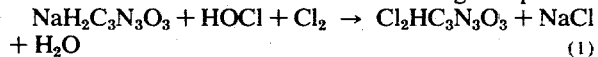

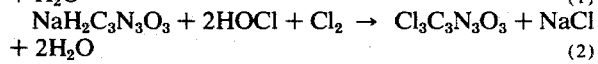

The product of Equation (1) is dichloroisocyanuric acid and that of Equation (2) is trichloroisocyanuric acid.

Gaseous by-products which can be formed during the reaction include compounds such as nitrogen trichloride, carbon, dioxide and ammonia. The build up of nitrogen trichloride should be avoided as it can be explosively dangerous, particularly at concentrations of above about 1000 ppm.

In an additional embodiment, an excess of chlorine-containing compound is fed to the reactor to remove any gaseous by-products formed during the chlorination reaction. The excess can be any suitable amount above the 1:1 molar ratio required to react with the alkali metal cyanurate present, as shown in Equations (1) and (2) above. A suitable excess of chlorine-containing compound is present when the molar ratio of chlorine-containing compound to monoalkali metal cyanurate fed to the reaction slurry is from about 1.01:1 to about 5:1 and preferably from about 1.1:1 to about 4:1. The excess portion of chlorine-containing compound used for sweeping by-product gases from the reaction slurry, is equivalent to a molar ratio of chlorine-containing compound to monoalkali metal cyanurate of from about 0.01:1 to about 4:1 and preferably from about 0.2:1 to about 3:1.

This excess of chlorine-containing compound containing gaseous by-products removed from the reaction slurry is conducted to a scrubbing unit containing an aqueous solution of an alkali metal compound selected from the group consisting of hydroxides and carbonates. Gaseous by-products such as nitrogen trichloride removed in the excess chlorine are decomposed in the scrubbing units to nitorgen and chlorine, and all chlorine present reacts with the alkali metal compound to form an aqueous solution of an alkali metal hypochlorite. The alkali metal hypochlorite is then further reacted, for example, with chlorine to produce a hypochlorous acid solution. This solution is then fed to the chlorination reaction. Those skilled in the art will readily recognize that an alkaline earth metal hydroxide or carbonate may be used in place of the alkali metal compound.

When chlorine octahydrate is used as the chlorine-containing compound, and an excess is desired, a reaction temperature of from about $10°$ to about $25°C.$ is preferred, to assure the release of chlorine to remove gaseous by-products.

While the process of the present invention may be carried out batch-wise, it is preferred to conduct a continuous process which comprises:

a. reacting an aqueous slurry of a monoalkali metal cyanurate in a first reactor with hypochlorous acid and a chlorine-containing compound selected from the group consisting of chlorine and chlorine octahydrate to form a reaction slurry containing said polychloroisocyanuric acid, wherein the chlorine-containing compound fed to the reaction slurry is in excess of the stoichiometric amount required to react with said monoalkali metal cyanurate, the proportion of chlorine-containing compound being equivalent to a molar ratio of chlorine-containing compound to monoalkali metal cyanurate of at least 1.01:1.

b. maintaining the temperature in the reaction slurry of from about $10°$ to about $25°C.$ and a pH of the reaction slurry from about 3 to about 4.5, c. using the excess of chlorine-containing compound to remove gaseous by-products formed during the reaction, d. reacting this excess containing gaseous by-products with an alkali metal compound selected from the group consisting of hydroxides and carbonates to produce a hypochlorite of the alkali metal in a second reactor, and e. reacting the hypochlorite with chlorine to produce hypochlorous acid and feeding the hypochlorous acid to the first reactor.

The polychloroisocyanuric acids produced by the process of the present invention have a relatively large crystal size and are easily separated from the mother liquor, for example by filtration.

This process produces a polychloroisocyanuric acid having reduced solubility in the mother liquor. For example, in the preparation of trichloroisocyanuric acid by the process of the present invention, the amount of product remaining in the mother liquor after precipitation is less than 50 percent of that remaining in the mother liquor of prior art processes.

In addition, gaseous by-products such as the highly explosive nitrogen trichloride are effectively removed from the chlorination reaction and decomposed to recover the chlorine present.

The process can be conducted in the presence of varying amounts of alkali metal chloride without harmfully affecting the yield or recovery of the product.

The monoalkali metal cyanurate used as a reactant in this invention can be prepared in any suitable manner, for example, by the reaction of cyanuric acid with an equimolar amount of an alkali metal hydroxide such as sodium hydroxide in an aqueous solution with the pH held at about 9.

Hypochlorous acid can be made by several methods including the chlorination of an aqueous solution of an alkali metal or alkaline earth hypochlorite, the chlorination of aqueous solutions of alkali metal or alkaline earth carbonates or bi-carbonates, or the reaction of an aqueous acid stronger than hypochlorous acid, for example, sulfuric, nitric, phosphoric or hydrochloric acid, with an alkali metal or alkaline earth metal hypochlorite. In the process of the present invention, it is preferred to prepare hypochlorous acid by the reaction of an aqueous solution of an alkali metal hypochlorite with a chlorinecontaining compound. The hypochlorous acid generator is maintained at a temperature of from about 0° to about 5°C. and it is important that hypochlorous acid being formed be retained in the generator for as short a time as possible, for example, no greater than about 10 minutes.

When chlorine is employed as the chlorine-containing compound, it can be used in the gas or liquid form.

Chlorine octahydrate can be prepared, for example, by the reaction of chlorine with water at a temperature of from about −5°C. to about 9°C. A suspension of chlorine octahydrate crystals is obtained containing about 10 to 30 percent by weight of chlorine.

The process of the present invention is further illustrated by the following examples. All percentages used are by weight unless otherwise specified.

EXAMPLE 1

An aqueous 15 percent monosodium cyanurate monohydrate slurry was pumped into a chlorinator at the rate of 24 parts per minute. Simultaneously added to the chlorinator were chlorine gas at the rate of 2.6 parts per minute and a 7 percent aqueous hypochlorous acid added at the rate of 36.8 parts per minute. The chlorinator pH was maintained between 3.0 and 3.5 by adjusting the monosodium cyanurate feed rate. The reaction feed rates gave a chlorinator retention time of 28 minutes. The temperature of the reaction was maintained at 15°C. by circulating cooling water through a jacket surrounding the chlorinator. Trichloroisocyanuric acid from the chlorinator was filtered, washed and vacuum dried at 100°–110°C. The product had an available chlorine assay of 91 percent (theoretical assay 91.67 percent). Conversion of monosodium cyanurate to trichloroisocyanuric acid was essentially 100 percent with 94 percent being recovered as dry trichloroisocyanuric acid. The balance (6 percent) was retained in the filtrate. A screen analysis of the crystal size of the product showed 76 percent of the product to be coarser than 200 mesh.

The rate of addition of chlorine provided the equivalent of 1.7 moles of $Cl_2$ per mole of monosodium cyanurate. Of this amount, 0.7 mole was an excess used to strip off any nitrogen trichloride formed and the resulting mixture was fed to a gas scrubber containing sodium hydroxide solution. Any $NCl_3$ present was decomposed to $N_2$ and $Cl_2$ and the chlorine present reacted with the NaOH to form a solution of sodium hypochlorite. This NaOCl solution was fed to a packed column reactor and reacted with chlorine gas to produce the hypochlorous acid fed to the chlorinator.

COMPARATIVE EXAMPLE

To the chlorinator of Example 1, a 25 percent slurry of cyanuric acid was fed. Simultaneously, hypochlorous acid was introduced and the feed rate of cyanuric acid adjusted to maintain the pH of the reaction at 3.0 to 3.5. None of the hypochlorous acid was used to remove gaseous by-products formed. The trichloroisocyanuric acid produced, after filtering and drying, had an available chlorine assay of 90.5 percent (theoretical assay 91.6 percent). Conversion of cyanuric acid to trichloroisocyanuric acid was essentially 100 percent, however, over 15 percent of the product was retained in the filtrate. While the conversion of cyanuric acid to trichloroisocyanuric acid was essentially 100 percent in both Example 1 and this Comparative Example, product loss in the filtrate in this Comparative Example was nearly 2.5 times as great as in Example 1.

EXAMPLE 2

An aqueous 15 percent monosodium cyanurate monohydrate slurry was charged to the chlorinator at the rate of 48 parts per minute. Simultaneously fed to the chlorinator were chlorine gas and an aqueous 7 percent hypochlorous acid at the rates of 3.6 parts per minute and 36.8 parts per minute respectively. The chlorinator pH of 3.0 to 4.0 was controlled by adjusting the sodium cyanurate feed rate. These reactant feed rates gave a chlorinator retention time of 20 minutes. The reaction temperature was maintained at 15°±5°C. by circulating chilled water through a jacket surrounding the chlorinator. The dichloroisocyanuric acid produced in the chlorinator was filtered, washed and vacuum dried at 100°–110°C. The product had an available chlorine assay of 63.1 percent (theoretical assay of 64.5 percent). Conversion of monosodium cyanurate to dichloroisocyanuric acid was essentially 100 percent with 95 percent being recovered as dry dichloroisocyanuric acid. The balance (5 percent) was retained in the mother liquor.

The rate of addition of chlorine produced the equivalent of 1.2 moles of $Cl_2$ per mole of monosodium cyanurate. Of this amount 0.2 mole was used to strip off any nitrogen trichloride formed and the mixutre fed to a gas scrubber containing sodium hydroxide solution. Any $NCl_3$ present was decomposed and the chlorine present reacted with the NaOH to form a sodium hypochlorite solution. This NaOCl solution was fed to a packed column reactor and reacted with chlorine gas to produce the hypochlorous acid fed to the chlorinator.

What is claimed is:

1. A process for preparing a polychloroisocyanuric acid which comprises reacting an aqueous slurry of a monoalkali metal cyanurate with hypochlorous acid and a chlorine-containing compound selected from the group consisting of chlorine and chlorine octahydrate to form a reaction slurry containing said polychloroisocyanuric acid, wherein the molar ratio of said chlorine-containing compound to said monoalkali metal cyanurate reacted in said reaction slurry is at least 1:1, and separating said polychloroisocyanuric acid from said reaction slurry.

2. The process of claim 1 wherein the temperature of said reaction slurry is maintained at from about −5° to about 45°C and the pH of said reaction slurry is from about 3 to about 4.5.

3. The process of claim 1 wherein the proportion of said chlorine-containing compound fed to said reaction slurry is comprised of the stoichiometric amount required to react with said monoalkali metal cyanurate and an excess portion of said chlorine-containing compound sufficient to remove by-product gases formed in said reaction slurry, the total proportion of said chlorine containing compound fed to said reaction slurry being equivalent to a molar ratio of said chlorine-containing compound to said monoalkali metal cyanurate in the range from about 1.01:1 to about 5.1.

4. The process of claim 3 wherein said total proportion of said chlorine-containing compound is equivalent to a molar ratio of said chlorine-containing compound to said monoalkali metal cyanurate in the range from about 1.1:1 to about 4:1.

5. The process of claim 4 wherein said monoalkali metal cyanurate is monosodium cyanurate and said temperature is from about 10° to about 25°C.

6. The process of claim 5 wherein said chlorine-containing compound is chlorine.

7. The process of claim 6 wherein said excess of chlorine-containing compound containing said gaseous by-products is reacted with an alkali metal compound selected from the group consisting of hydroxides and carbonates to form a hypochlorite of said alkali metal, said hypochlorite being further reacted with chlorine to produce hypochlorous acid.

8. The process of claim 7 wherein said monoalkali metal cyanurate is sodium cyanurate and said alkali metal compound is sodium hydroxide.

9. The process of claim 8 wherein the molar ratio of said hypochlorous acid to said monosodium cyanurate is in the range from about 1:1 to about 2.2:1.

10. The process of claim 9 wherein the molar ratio of said hypochlorous acid to said monosodium cyanurate is in the range from about 1:1 to about 1.1:1 and said polychloroisocyanuric acid is dichloroisocyanuric acid.

11. The process of claim 9 wherein the molar ratio of said hypochlorous acid to said monosodium cyanurate is in the range from about 2:1 to about 2.2:1 and said polychloroisocyanuric acid is trichloroisocyanuric acid.

12. The process of claim 1 wherein said process is a continuous process for preparing a polychloroisocyanuric acid which comprises:

a. reacting an aqueous slurry of a monoalkali metal cyanurate in a first reactor with hypochlorous acid and a chlorine-containing compound selected from the group consisting of chlorine and chlorine octahydrate to form a reaction slurry containing said polychloroisocyanuric acid, wherein the proportion of said chlorine-containing compound fed to said reaction slurry is in excess of the stoichiometric amount required to react with said monoalkali metal cyanurate, the proportion of chlorine-containing compound being equivalent to a molar ratio of said chlorine-containing compound to said monoalkali metal cyanurate of at least 1.01.1, b. maintaining the temperature in said reaction slurry in the range from about 10° to about 25°C. and the pH of said reaction slurry in the range from about 3 to 4.5, c. using said excess of said chlorine-containing compound to remove gaseous by-products formed during said reaction, d. reacting said excess containing gaseous by-products in a second reactor with an alkali metal compound selected from the group consisting of hydroxides and carbonates to produce a hypochlorite of said alkali metal, and e. reacting said hypochlorite with chlorine to produce said hypochlorous acid and recycling said hypochlorous acid to said first reactor.

13. The process of claim 12 wherein the molar ratio of said chlorine-containing compound to said monoalkali metal cyanurate is in the range from about 1.01:1 to about 5:1.

14. The process of claim 13 wherein the molar ratio of said hypochlorous acid to said monoalkali metal cyanurate is in the range from about 1:1 to about 2.2:1.

15. The process of claim 14 wherein said monoalkali metal cyanurate is monosodium cyanurate.

16. The process of claim 15 wherein said chlorine-containing compound is chlorine.

17. The process of claim 16 wherein the molar ratio of said chlorine to said monosodium cyanurate is in the range from about 1.1:1 to about 4:1.

18. The process of claim 17 wherein the molar ratio of said hypochlorous acid to said monosodium cyanurate is in the range from about 2:1 to about 2.2:1 and said polychloroisocyanuric acid is trichloroisocyanuric acid.

19. The process of claim 17 wherein the molar ratio of said hypochlorous acid to said monosodium cyanurate is in the range from about 1:1 to about 1.1:1 and said polychloroisocyanuric acid is dichloroisocyanuric acid.

* * * * *